March 24, 1964     H. M. STEIN     3,126,192
VACUUM HOLDER
Filed Nov. 13, 1962

INVENTOR.
HAROLD M. STEIN
BY
ATTORNEY

United States Patent Office 3,126,192
Patented Mar. 24, 1964

3,126,192
VACUUM HOLDER
Harold M. Stein, Troy, Ohio, assignor to Clary Corporation, San Gabriel, Calif., a corporation of California
Filed Nov. 13, 1962, Ser. No. 236,865
5 Claims. (Cl. 248—362)

This invention relates to vacuum holders and has particular reference to holders or hold-down devices generally used in the photographic and photolithographic arts to hold sheet material such as photographic film, paper or the like in proper position to be printed, copied or photographed.

Heretofore, vacuum blanket devices have generally been used for the above purpose. Such blankets were usually constructed of rubber or similar flexible material having a sealing bead or rib adjacent the outer periphery thereof. The sheet to be held was placed between the blanket and a glass cover plate, and the space between the blanket and plate was evacuated, causing the blanket to press the sheet against the cover plate. The bead, in this case, formed an hermetic seal against the plate to prevent leakage of air between the blanket and the plate.

Although such beaded blankets are generally satisfactory, appreciable time is generally required to evacuate and properly collapse the blanket so as to uniformly press the sheet against the glass plate throughout its entire area. Such waste of time is a cause of annoyance, particularly in cases where printing is done on a production basis.

Attempts have been made heretofore to increase the speed of evacuation and eliminate any entrapped air pockets which might cause photographic distortion by forming the outer face of the rubber blanket with corrugations or a field of projections to engage the sheet. Under certain circumstances, such corrugations or projections tend to dimple the sheet, causing streaks or other distortions during printing.

Also, after extensive use, the sealing beads on such prior art blankets tend to wear, due to rubbing action against the cover plate, thus reducing the sealing effectiveness of the beads. Also, there exists the possibility of breaking the glass plate, due to excessively high vacuum forces and/or uneven engagement between the glass plate and the material inserted between the same and the blanket.

Accordingly, a principal object of the present invention is to provide a vacuum holder which obviates the above noted difficulties found in prior art vacuum blankets.

Another object is to decrease the time required to evacuate a vacuum holder sufficiently to properly hold a sheet or the like in position.

Another object is to provide a novel vacuum holder which is a self-contained unit requiring no sealing lip or bead.

Another object is to provide a novel vacuum holder for sheets or the like which presents a smooth engaging surface for the material to be held.

Another object is to provide a novel and inexpensive vacuum holder for sheets or the like which does not require a vacuum frame to hold the same in intimate contact with a cover glass.

The manner in which the above and other objects of the invention are accomplished will be readily understood on reference to the following specification when read in conjunction with the accompanying drawings, wherein.

Figure 1:
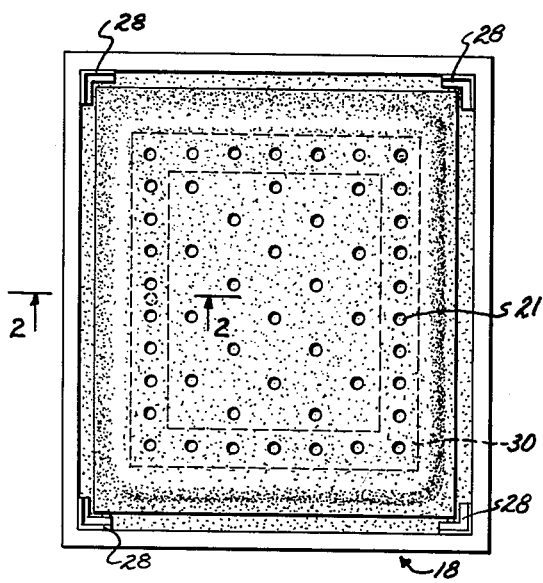
FIG. 1 is a plan view of a vacuum holder embodying a preferred form of the present invention and shown mounted in a support frame.
Figure 4:
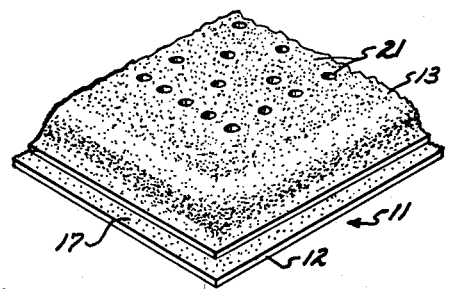
FIG. 4 is an enlarged perspective view of a portion of the vacuum holder.

Referring to the drawings, the vacuum holder, generally indicated at 11, is a self-contained flexible unit comprising a thin base sheet or member 12 of highly flexible rubbery material, preferably that known in the art as gum rubber. An upper sheet member 13 is provided, being formed of a thin sheet 14 of gum rubber, to which is bonded a relatively thicker sheet 15 of a rubbery material which is relatively stiffer than gum rubber.

The sheet 15 terminates within the periphery of the sheet 14 and the latter is bonded at 16 around its periphery to the sheet 12 to form an hermetically sealed envelope from which air may be evacuated. The periphery of sheet 14 terminates within the periphery of the base sheet 12, providing a marginal edge 17 whereby the holder may be clamped or otherwise secured to a suitable frame 18 to be described presently.

The under side of the sheet 15 is formed into coordinately arranged rows of equally spaced downwardly extending pyramidal projections 20 terminating in apexes which rest against the upper surface of the base sheet 12.

A pattern of holes 21 is formed coextensively through the sheets 14 and 15. Such holes, in this case, open into intersecting valleys or air channels formed between surrounding projections 20.

Figure 2:
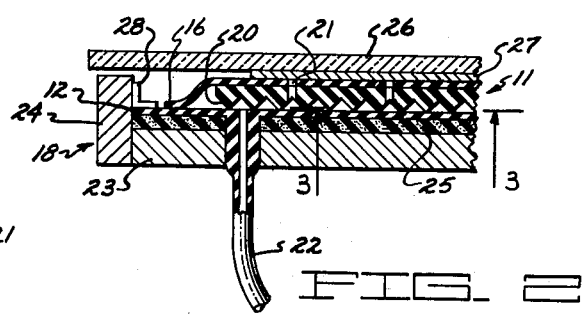
FIG. 2 is an enlarged sectional view through the holder and support frame and is taken along line 2—2 of FIG. 1.

As shown in FIG. 2, a vacuum tube 22 of rubber or the like is suitably bonded to the base sheet 12 and communicates with the interior of the envelope. The tube is arranged to be connected to a suitable vacuum pump or the like to enable air to be evacuated from the interior of the envelope.

FIGS. 1 and 2 illustrate the holder 11 as mounted in the supporting frame 18. The latter comprises a rigid base 23 having sides 24 surrounding the same. A layer 25 of soft sponge rubber or the like is interposed between the holder 11 and the base. A glass cover plate 26 is preferably hinged in a manner not shown to one of the sides 24 so that it may lie flat against the top of the holder or against a sheet 27 or sheets of photographic paper or the like to be processed.

The vacuum holder may be secured within the frame 18 by attachment of the marginal edge 17 of the base sheet 12 to brackets 28 located in the various corners of the frame so that the frame may be held in inverted position if desired.

In the event the sheet to be supported by the vacuum holder is not large enough to cover the pattern of air holes 21, a mask, as indicated for example by dotted lines 30, may be located over those holes falling outside the confines of the sheet to effectively seal off the latter holes.

In operation, the sheet 27 to be processed is laid directly over the top surface of the sheet 13 in a position covering the holes 21. It will be noted that such top surface is soft, smooth and devoid of any beads, corrugations, ribs or projections which might otherwise tend to dimple the sheet. A vacuum is applied to the tube 22 either before or after the glass plate is lowered. Because of the coordinate arrangement of air channels formed by the pyramidal projections 20 and because of the relatively small air space resulting in the interior of the envelope, air is quickly and uniformly drawn from all sections of the holder regardless of the location of the tube 22, and thereby, through the holes 21, securing the sheet 27 in place. The soft resilient nature of the outer sheet 13 insures that adequate sealing will occur between the sheet 13 and the sheet material 27 in the area surrounding each hole 21.

Figure 5:
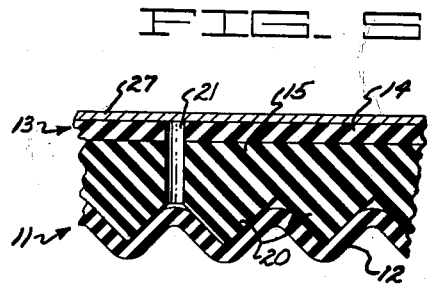
FIG. 5 is an enlarged fragmentary sectional view illustrating the holder in an evacuated condition.
Figure 3:
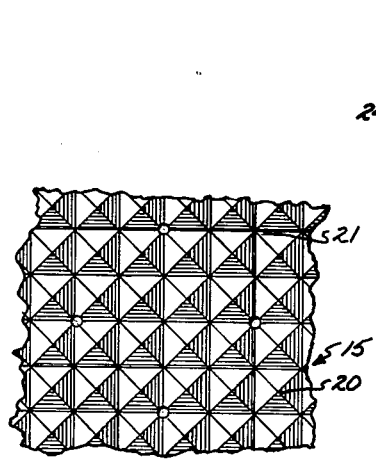
FIG. 3 is an enlarged fragmentary bottom view taken along line 3—3 of FIG. 2 showing the pyramidal construction of the upper sheet member.

Because of the relatively stiffer sheet 15 and the formation of the pyramidal projections 20 on the bottom surface thereof, dimpling of the upper face of the relatively soft sheet 13 bonded thereto is eliminated. Although such pyramidal projections are illustrated as having plane sides tapering to a point they may also be formed of conical sides. Also, it will be noted that as the air is evacuated from inside the holder, the relatively soft base sheet 12 is drawn partially into the interspaces between the projections 20 as shown in exaggerated form in FIG. 5. Accordingly, if excessive vacuum is applied to the envelope, the sheet 12 will tend to seal off the holes 21, thereby reducing any tendency toward inward dimpling of the portions of the sheet 27 located directly over the holes 21.

Pressure of the glass cover plate 26 against the sheet 27 either under the influence of gravity or by any additional slight mechanical pressure will cause the sheet 27 to lie flat against the plate and any irregularity will be taken up by the sponge rubber layer 25 resting on the frame base 23.

The vacuum holder may, under certain conditions, be used exclusively of the frame 18 and because of its flexible nature may be readily adapted to any curved or nonplanar supporting surface.

Because of the absence of sealing beads and corrugations or the like on the upper surface of the holder, wear otherwise incurred by rubbing of the glass cover plate is materially reduced.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto. For example, the air tube 22 may, if desired, be bonded to the upper sheet 14 instead of to the base sheet 12.

Having thus described the invention, what is desired to be secured by United States Letters Patent is:

1. A vacuum holder comprising an envelope having first and second flexible sheets sealed together adjacent their peripheries, said first sheet having an outer surface against which a paper or the like is to be held, a third sheet of less flexibility than said first sheet, said third sheet being bonded to the inside surface of said first sheet, a plurality of pyramidal projections extending inwardly from said third sheet into engagement with the inner surface of said second sheet to form intersecting air channels, coextensive openings in said first and third sheets connecting said outer surface of said first sheet with said air channels, said third sheet being of sufficient strength to resist collapsing upon conveying air from between said second and third sheets, said second sheet being adapted to collapse against said projections upon conveying air from between said sheets and means for conveying air from between said second and third sheets.

2. A vacuum holder comprising an envelope having first and second flexible side sheets of rubbery material, said first sheet having an outer surface against which a paper or the like is to be held, a third sheet of rubbery material having a greater stiffness than said first and second sheets, said third sheet being within said envelope and bonded to the inner surface of said first sheet, said third sheet having a plurality of pyramidal projections extending inwardly therefrom into engagement with the inner surface of said second sheet to form intersecting air channels, coextensive openings in said first and third sheets connecting said outer surface of said first sheet to said air channels, said third sheet resisting collapse upon evacuation of air from between said second and third sheets, and means for conveying air from between said second and third sheets, said second sheet being movable into said air channels upon partial evacuation of air from between said second and third sheets whereby to restrict further evacuation of air from between said second and third sheets.

3. A vacuum holder comprising an envelope having two flexible side members, a portion of a first one of said members having a plurality of coordinately arranged projections on the inside surface thereof, said projections engaging the inside surface of the other of said members, said projections forming intersecting air channels therebetween, said first member having an outer surface against which a sheet or the like is to be held, openings in said first member connecting said outer surface thereof with said air channels, said portion of said first member being of sufficient strength to resist collapsing of said first member upon conveying air from between said members, and means for conveying air from between said members.

4. A vacuum holder comprising an envelope having two flexible side members, a first one of said members having an outer surface against which a sheet or the like is to be held, a portion of said first member having a plurality of pyramidal projections on the inside surface thereof engageable with the inside surface of the other of said members, said projections forming intersecting air channels therebetween, openings in said first member connecting said outer surface thereof with said air channels, said portion of said first member being of sufficient strength to resist collapsing of said first member upon conveying air from between said members, and means for conveying air from between said members.

5. A vacuum holder comprising an envelope having two side members, a portion of one of said members having a plurality of pyramidal projections on the inside surface thereof, said projections engaging the inside surface of the other of said members, said projections forming intersecting air channels therebetween, said one member having an outside surface against which a sheet or the like is to be held, openings in said one member connecting said outside surface thereof with said air channels, said portion of said one member being of sufficient strength to resist collapsing of said one member upon conveying air from between said members, and means for conveying air from between said members, at least said other side member being flexible.

References Cited in the file of this patent
UNITED STATES PATENTS 2,956,769    Sigler et al.    Oct. 18, 1960
3,042,356    Audino    July 3, 1962